US008005029B1

(12) United States Patent　　　　　　(10) Patent No.: US 8,005,029 B1
Thomas　　　　　　　　　　　　　　　(45) Date of Patent: Aug. 23, 2011

(54) ERROR HANDLING FOR NAMED SIGNAL EVENTS IN WIRELESS COMMUNICATIONS

(75) Inventor: Michael Flynn Thomas, Plano, TX (US)

(73) Assignee: Nortel Networks Limited, Mississauga, Ontario (CA)

( * ) Notice: Subject to any disclaimer, the term of this patent is extended or adjusted under 35 U.S.C. 154(b) by 1587 days.

(21) Appl. No.: 11/316,428

(22) Filed: Dec. 22, 2005

(51) Int. Cl.
*H04B 7/00* (2006.01)
(52) U.S. Cl. ......... 370/310; 370/311; 370/312; 370/328
(58) Field of Classification Search .............. 370/310, 370/311, 312, 328
See application file for complete search history.

(56) References Cited

U.S. PATENT DOCUMENTS

2006/0092963 A1* 5/2006 Bakre et al. ............... 370/437
2006/0120284 A1* 6/2006 Kim et al. .................. 370/230

OTHER PUBLICATIONS

Schulzrinne/Petrack, "RTP Payload for DTMF Digits, Telephony Tones and Telephony Signals," Internet Engineering Task Force Internet Draft, May 28, 2002, draft-ietf-avt-rfc2833bis-00.txt, Expires Dec. 2001.
Schulzrinne, H. and Petrack, S., "RTP Payload for DTMF Digits, Telephony Tones and Telephony Signals," Internet Engineering Task Force Internet Draft, Oct. 21, 2002, draft-ietf-avt-rfc2833bis-01.txt, Expires Mar. 2003.
Schulzrinne, H. and Petrack, S., "RTP Payload for DTMF Digits, Telephony Tones and Telephony Signals," Internet Engineering Task Force Internet Draft, Dec. 5, 2002, draft-ietf-avt-rfc2833bis-02.txt, Expires Apr. 2003.
Schulzrinne, H. and Petrack, S., "RTP Payload for DTMF Digits, Telephony Tones and Telephony Signals," Internet Engineering Task Force Internet Draft, Jul. 1, 2003, draft-ietf-avt-rfc2833bis-03.txt, Expires Dec. 2003.
Schulzrinne, H. and Petrack, S., "RTP Payload for DTMF Digits, Telephony Tones and Telephony Signals," Audio/Video Transport (avt) Internet-Draft, Nov. 9, 2005, draft-ietf-avt-rfc2833bis-12.txt, Expires May 13, 2006.

* cited by examiner

*Primary Examiner* — Kamran Afshar
*Assistant Examiner* — Sayed T Zewari
(74) *Attorney, Agent, or Firm* — Winthrow & Terranova, PLLC

(57) ABSTRACT

The present invention provides a technique for handling damaged named signal event (NSE) packets that are received in association with a voice over packet based telephony call. The received packets for a telephony call may include voice packets as well as NSE packets. Upon receipt of the packets at a physical layer, the packets are processed at a link layer to detect damaged packets having link layer errors. The incoming packets are sent to an audio application at an application layer for further processing. For damaged packets, link layer error indicia is generated at the link layer and sent to the audio processing application. The audio application will use the link layer error indicia to identify damaged packets or payloads associated with damaged packets, and determine whether the payloads corresponding to the damaged packets include NSE information defining an NSE. Damaged NSE packets are processed accordingly.

22 Claims, 5 Drawing Sheets

ERROR HANDLING FOR NAMED SIGNAL EVENTS IN WIRELESS COMMUNICATIONS

FIELD OF THE INVENTION

The present invention relates to wireless communications, and in particular to detecting and processing damaged packets carrying named signal event information in association with a telephony call.

BACKGROUND OF THE INVENTION

The public switched telephone network (PSTN) has traditionally provided telephony communications to the masses. The PSTN is a circuit-switched network where each call is essentially allocated a dedicated circuit through which audio signals are carried. These audio signals may include voice information as well as in-band signaling information. The in-band signaling information is tones or tone sequences for providing audible alerts to one of the parties to the call as well as for conveying control information among communication terminals and call processing entities in the PSTN. For example, the audible alerts may include the traditional busy, fast busy, and ringing alerts provided to a caller when the call is being initiated. The control information may include dual tone multi-frequency (DTMF) tones corresponding to keys on the telephone terminal's keypad. The DTMF tones may correspond to dialed digits used to initiate a call or a selection made by a caller during automated call processing. The events requiring delivery of in-band signaling information are generally referred to as named signal events.

Given the increased capacity and reliability of packet networks, such as the Internet, telephony communications can now be supported over the packet networks. Packet-based telephony communications are often referred to as voice-over-packet (VoP) communications or, when supported by the Internet Protocol (IP), voice over IP (VoIP) communications. For VoP telephony, audio signals are encoded and placed into packets, which are delivered over the packet networks.

In an effort to maintain a consistent user experience among PSTN and VoP telephony, named signal events are used VoP telephony. However, in VoP telephony the tones associated with the named signal events are generally not encoded with the voice information. Instead, a tone description corresponding to the tone is placed in a packet, which is delivered over the packet network. The tone description may define the tone or tone sequence as well as length information describing how long the each tone should be provided when presented to the intended party or device. Further information regarding the handling of named signal events for VoP telephony is provided in Internet Engineering Task Force (IETF) Request For Comment (RFC) 2833, which is incorporated herein by reference.

Notably, VoP packets for telephony communications are streamed from one communication terminal to another over the packet network in real time. Since there is no time for retransmission of lost or damaged packets and the nature of voice allows for a significant number of lost or damaged packets without undue degradation of the voice signal, error checking is not provided for received voice packets. When packet networks provide wireless access for wireless communication terminals, the likelihood of damaged packets being received increases dramatically over wired packet networks. The impact of damaged packets on the voice signal is tolerable; however, the impact on packets carrying named signal event information is more problematic. Errors may result in generating the wrong tones, generating tones for the wrong lengths of time, and the like. Since error checking is often disabled for VoIP telephony in a wireless environment, there is no way to detect the errors in the packets carrying named signal event information. Accordingly, there is need for a way to efficiently and effectively detect and process errant packets carrying named signal event information in association with a VoIP telephony call.

SUMMARY OF THE INVENTION

The present invention provides an efficient and effective technique for handling damaged named signal event (NSE) packets that are received in association with a voice over packet based telephony call. The received packets for a telephony call may include voice packets as well as NSE packets. Upon receipt of the packets at a physical layer, the packets are processed at a link layer to detect damaged packets having link layer errors. Whether damaged or not, the incoming packets are sent to an audio application at an application layer for further processing. For damaged packets, link layer error indication is generated at the link layer and sent to the audio processing application at the application layer. The audio application will use the link layer error indicia to identify damaged packets or payloads associated with damaged packets, and determine whether the payloads corresponding to the damaged packets include NSE information defining a named signal event. If the damaged packets have NSE information, damaged NSE packets are processed accordingly.

In one embodiment, damaged NSE packets, and in particular the payloads corresponding to the damaged NSE packets, are discarded. Thus, the audio processing application will process damaged and undamaged voice packets, as well as undamaged NSE packets, in traditional fashion. The damaged NSE packets are processed as desired or discarded to minimize the impact of receiving errant information defining a named signal event. A named signal event may include any in-band signaling, such as a busy, fast busy, or ringing tones heard by a caller during initiation of a call, as well as the delivery of dual tone multi-frequency tones used for initiating a call or selecting options during automated call processing.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
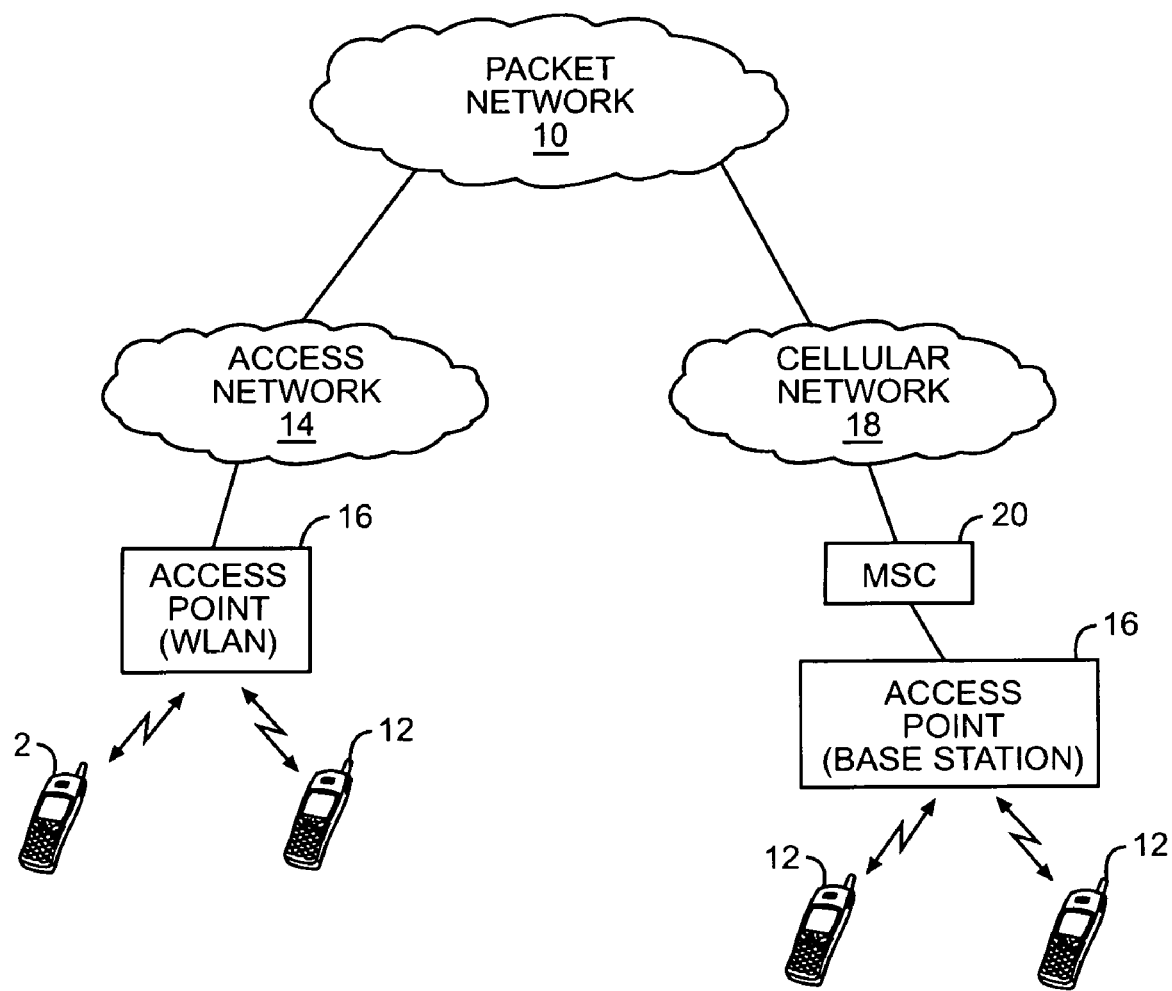
FIG. 1 is a block representation of a communication environment according to one embodiment of the present invention.

Prior to delving into the details of the present invention, an overview of a wireless communication environment is illustrated in FIG. 1. As illustrated, a packet network 10 supports telephony communications with or between any number of mobile terminals 12. Generally, an access point 16 is used to support wireless communications with the mobile terminals 12 and will directly or indirectly connect to the packet network 10. For local wireless communications, such as those facilitated using Bluetooth or wireless local area network (WLAN) standards, such as those set forth in the IEEE's 802.11 standards, the access point 16 will provide a relatively limited local wireless communication zone in which local wireless communications are supported, and will connect to the packet network 10 through an access network 14. In a cellular environment, the access point 16 may take the form of a cellular base station that connects to a cellular network 18 via a mobile switching center (MSC) 20. The cellular network 18 will directly or indirectly connect to the packet network 10.

The present invention can be implemented in either the access point 16 or the mobile terminal 12, and functions to detect and process damaged packets that carry named signal event (NSE) information in association with a telephony call. The packets carrying NSE information will be referred to as NSE packets. The NSE packets are provided in the same data stream as the streaming voice packets, if the telephony call has been established and voice information is present. Accordingly, during a telephony call, a stream of packets flowing between the access point 16 and a mobile terminal 12 may include NSE packets intermingled with the voice packets. During initiation of the telephony call or during silent periods during the telephony call, the NSE packets may be intermingled with packets presenting silence, or may simply be delivered as necessary.

Instead of allowing errant NSE packets to be delivered and processed along with other packets associated with a telephony call, the present invention detects damaged NSE packets at a link layer and alerts an audio application that processes the incoming voice signals for the telephony call. The audio application can then process the damaged NSE packets as necessary. In one embodiment, the damaged NSE packets are discarded and NSE packets arriving undamaged are processed in normal fashion.

Figure 2:
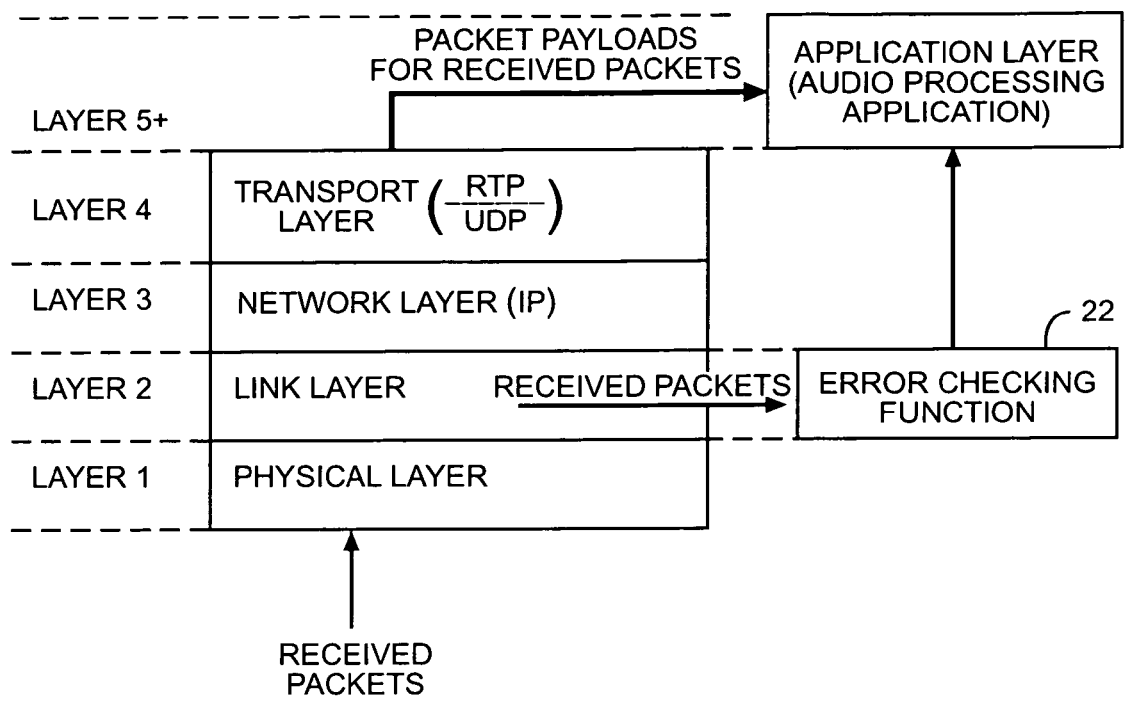
FIG. 2 is a block representation of layer processing according to one embodiment of the present invention.

With reference to FIG. 2, a block representation of the basic operation of the present invention is illustrated with respect to a wireless communication protocol model. Although additional layers may be employed, the model illustrated provides five layers: a physical layer (Layer 1), a link layer (Layer 2), a network layer (Layer 3), a transport layer (Layer 4), and an application layer (Layer 5+). The physical layer (Layer 1) provides the hardware mechanisms responsible for sending and receiving wireless signals. The link layer (Layer 2) affords transmission protocol knowledge and management, as well as handling errors in the physical layer, flow control, and frame or packet synchronization. The link layer is often divided into two logical sub-layers: the media access control (MAC) layer, and a logical link control (LLC) layer. The MAC sub-layer controls network access transmission permission. The LLC sub-layer controls error checking, flow control, and frame synchronization. The network layer (Layer 3) provides routing or forwarding functions, perhaps based on the Internet Protocol (IP).

The transport layer (Layer 4) operates to provide transparent transfer of voice information between communication endpoints, such as the mobile terminals 12 and the communication terminal for the remote party engaged in the telephony call. The transport layer is responsible for controlling packet flow from endpoint to endpoint, and may operate to ensure complete transfer of the information from one endpoint to another. The transport layer for VoP telephony may use the Real-Time Protocol (RTP) to control the streaming of voice packets and any NSE packets associated with a telephony call. The User Datagram Protocol (UDP) is employed in the transport layer for RTP communications to facilitate delivery of the RTP information being communicated from one endpoint to another. Using the UDP checksum, the receiver can detect damage in packets. For a VoIP wireless call, error detection will typically be disabled. Thus, the transport layer cannot detect damaged packets for a VoP telephony call, and the information carried in the damaged packets will be provided to the application layer (Layer 5+) for normal audio processing by an audio processing application and would result in improper behavior.

For the present invention, an error checking function 22 is provided at the link layer (Layer 2), wherein received NSE packets from the physical layer (Layer 1) are monitored to detect errors occurring at the physical layer. These errors are essentially radio frequency (RF) errors recognizable at the link layer. The error checking function 22 will monitor all incoming packets and detect damaged packets. Upon detecting a damaged packet, the link layer error indicia for the damaged packet is provided to the audio processing application at the application layer (Layer 5+). The audio processing application will correlate the link layer error indicia with a corresponding packet or packet payload, and determine if the packet is an NSE packet by looking for NSE information in the payload of the packet. If the payload includes NSE information, and thus the packet is an NSE packet, the packet may be dropped or processed as desired.

Figure 3:
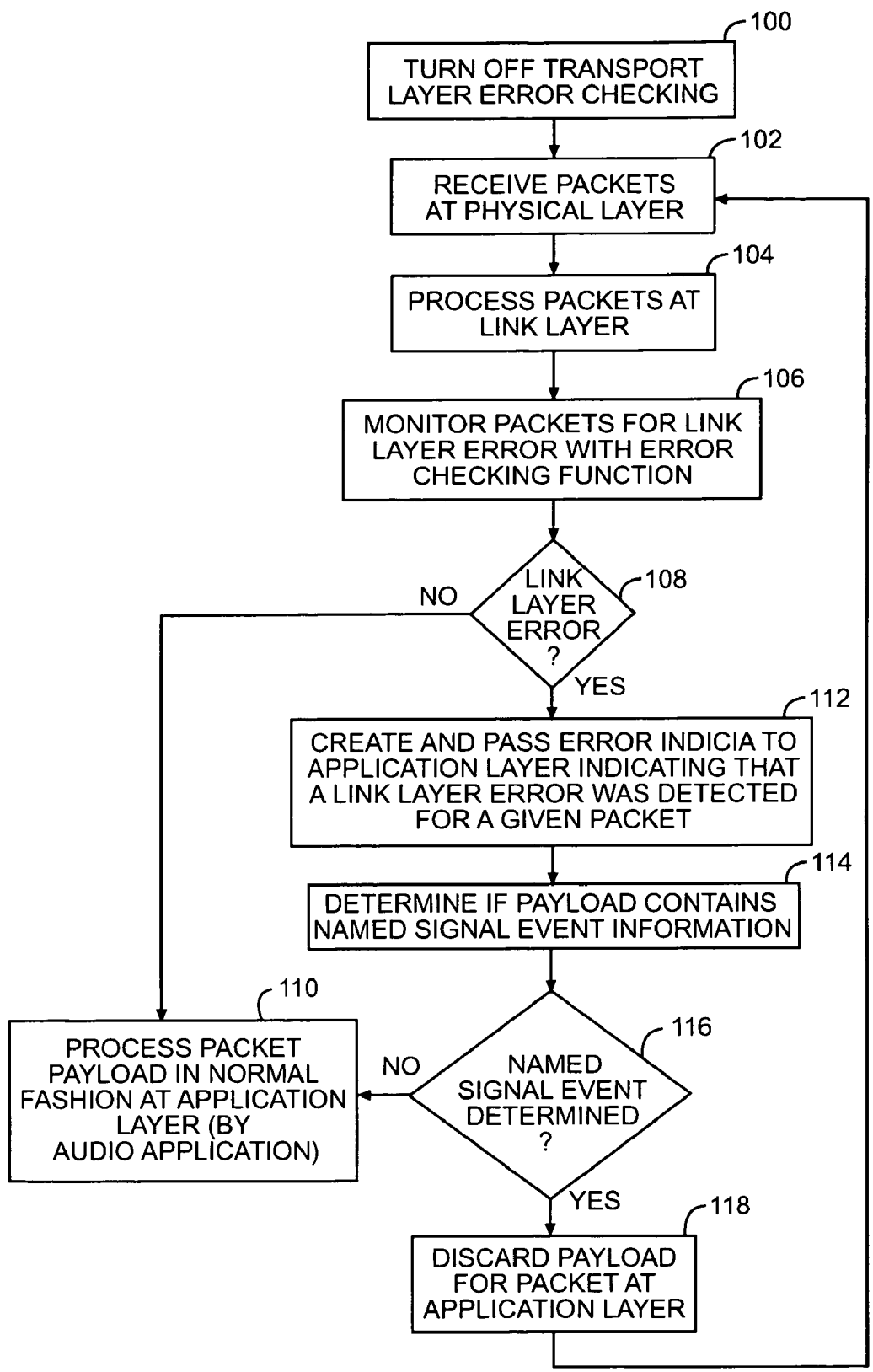
FIG. 3 is a flow diagram illustrating error handling according to one embodiment of the present invention.

Turning now to FIG. 3, a flow diagram is provided to illustrate receiving streaming packets associated with a telephony call, and in particular, processing the NSE packets when damage is detected. Initially, the transport layer (Layer 4) error checking is turned off or otherwise deactivated (step 100). At some point, packets associated with a telephony call are received at the physical layer (Layer 1) (step 102) and processed at the link layer (Layer 2) (step 104). The packets may be NSE packets, voice packets, or a combination thereof. The received packets are monitored for link layer errors with the error checking function 22 (step 106). For each packet, if there is no link layer error (step 108), the packet is provided to the application layer (Layer 5+) where the packet is processed in normal fashion by an audio application or the like (step 110).

If a link layer error is detected for a given packet by the error checking function 22 (step 108), error indicia is created and passed to the application layer (Layer 5+) indicating that a link layer error was detected for the packet (step 112). The audio application at the application layer will receive the link layer error indicia and determine if the damaged packet was an NSE packet by seeing if the payload contains named signal event information (step 114). If the packet was an NSE packet (step 116), the payload of the NSE packet is discarded at the application layer (step 118) or processed as desired. If the packet is not an NSE packet (step 116), the packet payload is processed in normal fashion at the application layer by the audio application (step 110). Accordingly, the audio application can receive error indicia from the link layer indicating that the packet is damaged. If the damaged packet is an NSE packet, the payload for the damaged NSE packet can be dropped to minimize the impact of the damaged packet on the voice processing, and thus the telephony call.

Figure 4:
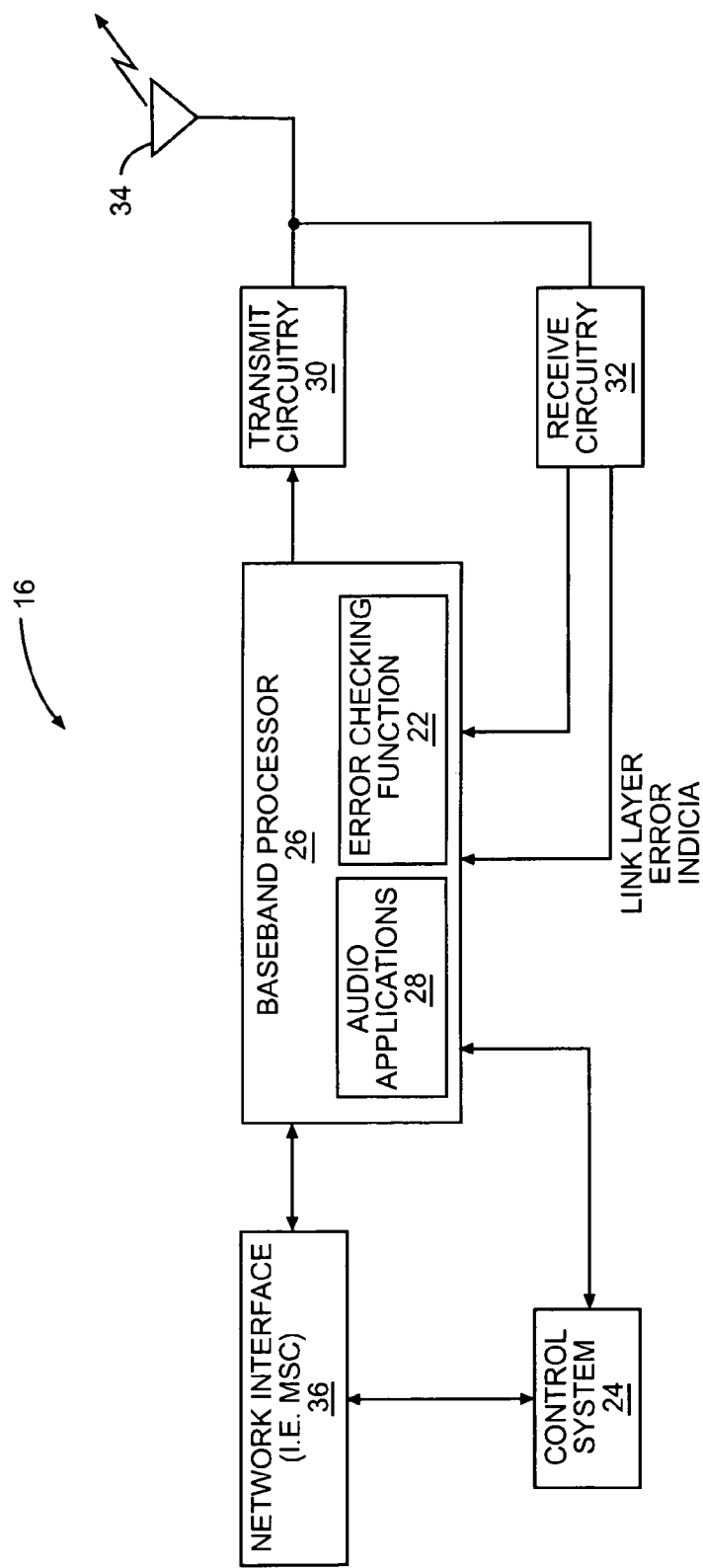
FIG. 4 is a block representation of an access point according to one embodiment of the present invention.

With reference to FIG. 4, an access point 16 configured according to one embodiment of the present invention is illustrated. The access point 16 generally includes a control system 24, a baseband processor 26 providing the audio applications 28 and error checking function 22, transmit circuitry 30, receive circuitry 32, an antenna 34, and a network interface 36, which may connect to the MSC 20 in a cellular embodiment or an access network 14 in a WLAN embodiment. The receive circuitry 32 receives radio frequency signals through the antenna 34 bearing packets associated with telephony calls from mobile terminals 12. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 22 processes the digitized received signal to extract the information or data bits conveyed in the received signal. Again, the error checking function 22 and the audio applications 28 may be implemented in the baseband processor 26. This processing typically comprises demodulation, decoding, error detection, and audio processing. As such, the baseband processor 26 is generally implemented in one or more digital signal processors (DSPs). The received information is then sent across a wireless network via the network interface 36 or transmitted to another mobile terminal 12 serviced by the access point 16.

On the transmit side, the baseband processor 26 receives digitized data, which may represent voice, data, or NSE information, from the network interface 36 under the control of control system 24, and encodes the data for transmission. The encoded data is output to the transmit circuitry 30, where it is modulated by a carrier signal having a desired transmit frequency or frequencies. A power amplifier (not shown) will amplify the modulated carrier signal to a level appropriate for transmission, and deliver the modulated carrier signal to the antenna 34.

Figure 5:
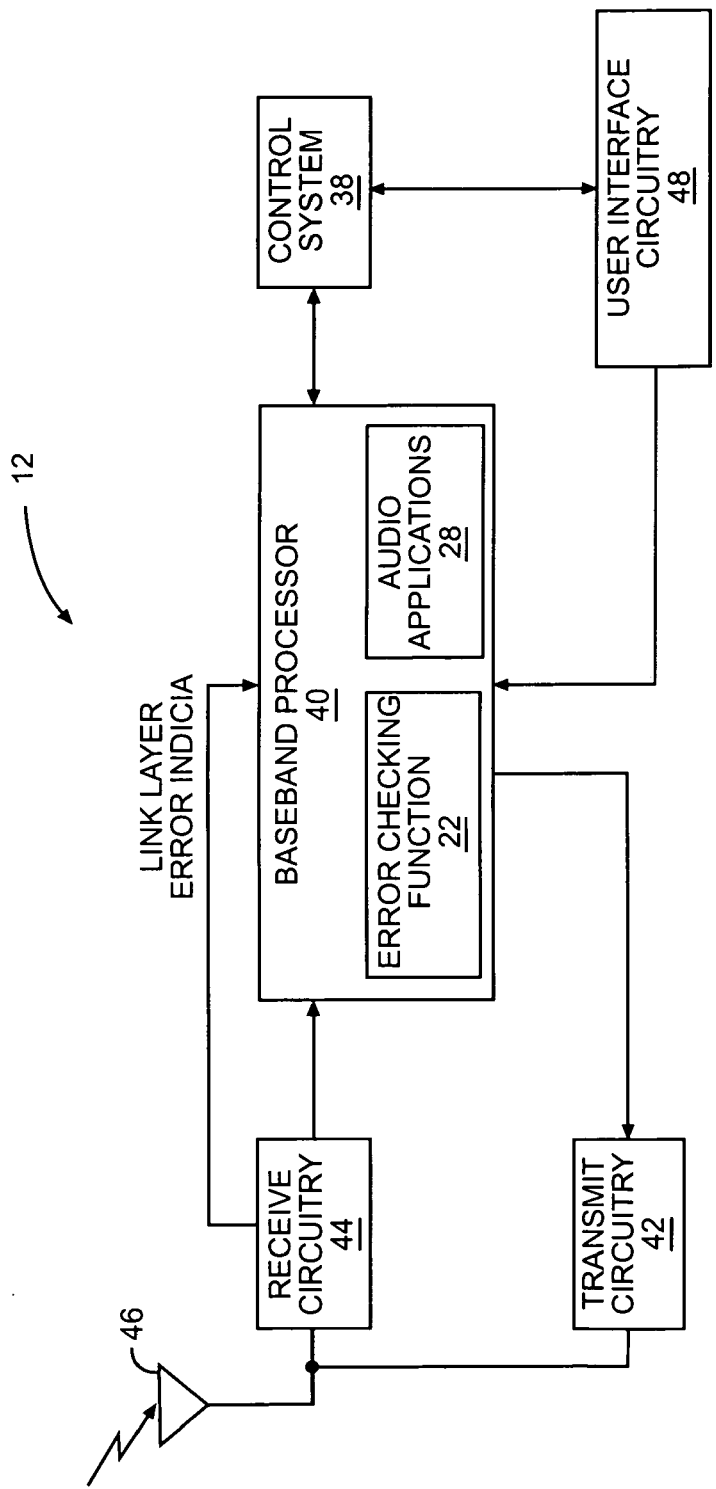
FIG. 5 is a block representation of a mobile terminal according to one embodiment of the present invention.

With reference to FIG. 5, a mobile terminal 12 configured according to one embodiment of the present invention is illustrated. Similarly to the access point 16, the mobile terminal 12 will include a control system 38, a baseband processor 40 providing the audio applications 28 and error checking function 22, transmit circuitry 42, receive circuitry 44, an antenna 46, and user interface circuitry 48. The receive circuitry 44 receives radio frequency signals through the antenna 46 bearing information from one or more access points 16. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams. The baseband processor 40 processes the digitized received signal to extract the information or data bits conveyed in the received signal. This processing typically comprises demodulation, decoding, error correction, and audio processing.

For transmission, the baseband processor 40 receives digitized data, which may represent voice, data, or NSE information, from the control system 38, which it encodes for transmission. The encoded data is output to the transmit circuitry 42, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antenna 46.

Those skilled in the art will recognize improvements and modifications to the preferred embodiments of the present invention. All such improvements and modifications are considered within the scope of the concepts disclosed herein and the claims that follow.

What is claimed is:

1. A method for handling packets received over a wireless communication link for a telephony call comprising:
   receiving incoming packets associated with a telephony call via a wireless communication interface at a physical layer;
   detecting damaged packets of the incoming packets at a link layer;
   providing link layer error indicia identifying the damaged packets from the link layer to an application running at an application layer;
   identifying damaged named signal event packets of the damaged packets based on the link layer error indicia at the application layer; and
   providing error processing for the damaged named signal event packets by the application at the application layer to address damage to named signal event packets.

2. The method of claim 1 wherein the incoming packets comprise the named signal event packets and voice packets, the method further comprising providing audio processing by the application for the voice packets and undamaged ones of the named signal event packets.

3. The method of claim 2 wherein the audio processing is provided for damaged and undamaged ones of the voice packets.

4. The method of claim 1 wherein identifying the damaged named signal packets comprises:
   detecting damaged packets based on link layer error indicia;
   monitoring payloads of the damaged packets to detect named signal event information defining a named signal event located in the payloads; and
   identifying ones of the damaged packets having payloads comprising named signal event information as the damaged named signal event packets.

5. The method of claim 1 wherein providing error processing comprises discarding the damaged named signal event packets or payloads of the damaged named signal event packets.

6. The method of claim 1 wherein the incoming packets are streamed using a real time steaming protocol, RTP, and include voice packets and the named signal event packets.

7. The method of claim 6 further comprising deactivating error processing at a transport layer such that the incoming packets, whether damaged or properly received, are passed from the link layer to the application layer.

8. The method of claim 1 wherein a named signal event represents an in-band signaling event for the telephony call.

9. The method of claim 8 wherein the named signal event comprises at least one of a tone and a sequence of tones.

10. The method of claim 9 wherein the named signal event corresponds to at least one of the group consisting of a ringing signal, a busy signal, and a fast busy signal to be presented to a party initiating the telephony call.

11. The method of claim 9 wherein the named signal event corresponds to at least one dual-tone multi-frequency tone corresponding to pressing a key of a telephony keypad.

12. An apparatus for handling packets received over a wireless communication link for a telephony call comprising:
   a wireless communication interface; and
   a processor associated with the wireless communication interface and adapted to:
      receive incoming packets associated with a telephony call via the wireless communication interface at a physical layer;
      detect damaged packets of the incoming packets at a link layer;
      provide link layer error indicia identifying the damaged packets from the link layer to an application running at an application layer;
      identify damaged named signal event packets of the damaged packets based on link layer error indication (s) at the application layer; and
      provide error processing for the damaged named signal event packets by the application at the application layer to address damage to named signal event packets.

13. The apparatus of claim 12 wherein the incoming packets comprise the named signal event packets and voice packets, and the processor is adapted to provide audio processing by the application for the voice packets and undamaged ones of the named signal event packets.

14. The apparatus of claim 13 wherein the audio processing is provided for damaged and undamaged ones of the voice packets.

15. The apparatus of claim 12 wherein to identify the damaged named signal packets, the processor is adapted to:
   detect damaged packets based on link layer error indicia;
   monitor payloads of the damaged packets to detect named signal event information defining a named signal event located in the payloads; and
   identify ones of the damaged packets having payloads comprising named signal event information as the damaged named signal event packets.

16. The apparatus of claim 12 wherein to provide error processing, the processor is adapted to discard the damaged named signal event packets or payloads of the damaged named signal event packets.

17. The apparatus of claim 12 wherein the incoming packets are streamed using a real time steaming protocol and include voice packets and the named signal event packets.

18. The apparatus of claim 17 wherein the processor is adapted to deactivate error processing at a transport layer such the incoming packets, whether damaged or properly received, are passed from the link layer to the application layer.

19. The apparatus of claim 12 wherein a named signal event represents an in-band signaling event for the telephony call.

20. The apparatus of claim 19 wherein the named signal event comprises at least one of a tone and a sequence of tones.

21. The apparatus of claim 20 wherein the named signal event corresponds to at least one of the group consisting of a ringing signal, a busy signal, and a fast busy signal to be presented to a party initiating the telephony call.

22. The apparatus of claim 20 wherein the named signal event corresponds to at least one dual-tone multi-frequency tone corresponding to pressing a key of a telephony keypad.

* * * * *